US011512813B2

(12) United States Patent
Choi

(10) Patent No.: US 11,512,813 B2
(45) Date of Patent: Nov. 29, 2022

(54) HIGH-PRESSURE GAS CYLINDER GASKET AUTOMATIC REPLACEMENT DEVICE

(71) Applicant: AMT CO., LTD., Asan-si (KR)

(72) Inventor: Won Ho Choi, Cheonan-si (KR)

(73) Assignee: AMT CO., LTD., Asan-si (KR)

( * ) Notice: Subject to any disclaimer, the term of this patent is extended or adjusted under 35 U.S.C. 154(b) by 285 days.

(21) Appl. No.: 16/772,392

(22) PCT Filed: Dec. 13, 2018

(86) PCT No.: PCT/KR2018/015819
§ 371 (c)(1),
(2) Date: Jun. 12, 2020

(87) PCT Pub. No.: WO2019/117641
PCT Pub. Date: Jun. 20, 2019

(65) Prior Publication Data
US 2021/0080061 A1    Mar. 18, 2021

(30) Foreign Application Priority Data
Dec. 13, 2017   (KR) .................. 10-2017-0170933
Dec. 11, 2018   (KR) .................. 10-2018-0159464

(51) Int. Cl.
*F17C 13/04*     (2006.01)
*B23P 19/04*     (2006.01)
*F17C 13/12*     (2006.01)

(52) U.S. Cl.
CPC .............. *F17C 13/04* (2013.01); *B23P 19/04* (2013.01); *F17C 13/12* (2013.01);
(Continued)

(58) Field of Classification Search
CPC .. F17C 13/04; F17C 13/12; F17C 2205/0338; F17C 2205/037; F17C 2250/043;
(Continued)

(56) References Cited

U.S. PATENT DOCUMENTS 4,363,424 A * 12/1982 Holben ................. F17C 13/002
222/4
4,620,349 A * 11/1986 Terral .................... E21B 17/006
29/451
(Continued)

FOREIGN PATENT DOCUMENTS

JP    H06-050431 A    2/1994
JP    2000-141141 A   5/2000
(Continued)

OTHER PUBLICATIONS

International Search Report for PCT/KR2018/015819 dated Apr. 1, 2019 from Korean Intellectual Property Office.

*Primary Examiner* — Rick K Chang
(74) *Attorney, Agent, or Firm* — Paratus Law Group, PLLC

(57) ABSTRACT

Disclosed is a high-pressure gas cylinder automatic replacement device, including: a holder fixedly provided on a main plate to be positioned at one side of a connector holder of a high-pressure gas cylinder connection unit; a movable member rotatably provided at the holder; a two-stage actuator provided at the holder such that rods thereof are respectively connected to the movable member and a bracket fixed to the main plate; a docking actuator enabling the movable member to move from the holder towards the connector holder side or vice versa; a gasket removal cartridge provided at the movable member to automatically remove used gaskets from the connector holder and to accommodate the same in turn; and a gasket insertion cartridge provided at the movable member positioned at the upper portion of the gasket removal cartridge to insert a new gasket accommodated therein into the connector holder.

10 Claims, 9 Drawing Sheets

(52) U.S. Cl.
CPC ............... *F17C 2205/037* (2013.01); *F17C 2205/0338* (2013.01); *F17C 2250/043* (2013.01); *F17C 2270/0518* (2013.01)

(58) Field of Classification Search
CPC ........ F17C 2270/0518; F17C 2260/036; B23P 19/04; B25B 27/0028
See application file for complete search history.

(56) References Cited

U.S. PATENT DOCUMENTS

| | | | | |
|---|---|---|---|---|
| 4,648,431 A | * | 3/1987 | Strongert | F17C 13/04 137/596.2 |
| 2001/0032681 A1 | * | 10/2001 | Johnston | F16K 1/303 141/346 |
| 2017/0106402 A1 | * | 4/2017 | Pringle, IV | B05C 11/10 |

FOREIGN PATENT DOCUMENTS

| | | |
|---|---|---|
| JP | 3980173 B2 | 9/2007 |
| KR | 10-0242982 B1 | 2/2000 |
| KR | 10-0649112 B1 | 11/2006 |
| KR | 10-0985575 B1 | 10/2010 |
| KR | 10-1190700 B1 | 10/2012 |
| KR | 10-1245242 B1 | 3/2013 |

* cited by examiner

HIGH-PRESSURE GAS CYLINDER GASKET AUTOMATIC REPLACEMENT DEVICE

CROSS-REFERENCE TO PRIOR APPLICATIONS

This application is a National Stage Patent Application of PCT International Patent Application No. PCT/KR2018/015819 (filed on Dec. 13, 2018) under 35 U.S.C. § 371, which claims priority to Korean Patent Application Nos. 10-2017-0170933 (filed on Dec. 13, 2017) and 10-2018-0159464 (filed on Dec. 11, 2018), which are all hereby incorporated by reference in their entirety.

BACKGROUND

The present invention relates to a high-pressure gas cylinder gasket automatic replacement device for replacing, during the replacement of a high-pressure gas cylinder, a gasket with a new gasket according to the deformation of the gasket so as to maintain airtightness and, more particularly, to a high-pressure gas cylinder gasket automatic replacement device, in which a used gasket is removed from a connector holder of a connection unit and then a new gasket can be automatically inserted therein.

In general, various kinds of gas are supplied and used in a manufacturing process for manufacturing a semiconductor, and in the case where the gas is sucked into the human body or exposed to the atmosphere, the gas mostly causes great damage such as safety accidents and environmental contamination and thus careful attention is required.

For example, as the type of gas used in the ion implantation process, there is fluent gas such as Arsine (AsH3), Phosphine (PH3), or Boron Fluoride (BF3), and the gas must be carefully managed so that the gas does not leak during the supply to the production line because the gas is highly toxic and results in fatal consequences when a worker inhales the same in the respiratory system.

The gas used in the semiconductor manufacturing process is very important in its management, wherein the gas is supplied to a production line through a gas supply line in a state, in which the gas is charged with high-pressure in a gas container (hereinafter, referred to as a "high-pressure gas cylinder") and the gas cylinder is installed in a cabinet, and if the gas is exhausted by about 90%, a worker continues to supply gas by replacing the high-pressure gas cylinder with a new high-pressure gas cylinder so that the foreign substances remaining inside the high-pressure gas cylinder are not supplied to the wafer processing process.

FIG. 1 is a perspective view for schematically showing a prior art gas supply device of semiconductor equipment, in which a cabinet 1 is positioned at a predetermined position outside an FAB 7 so as to install a plurality of high-pressure gas cylinders (not illustrated) respectively filled with process gas such as SiH4, PH3, NF3, and CF4, which are required by various equipment 8 in the FAB 7, and a duct 4 is installed at one side of the cabinet 1 so as to guide gas supply lines 3 connected to the high-pressure gas cylinders, respectively.

In order to supply the process gas introduced along the gas supply lines 3, regulator boxes 5 are installed at the other side of the duct 4 as many as the number corresponding to the number of the high-pressure gas cylinders, and supply pipes 9 are connected to the upper portion of each of the regulator boxes 5, wherein the number of the supply pipes 9 is equal to the number of the equipment 8 so that the supply pipes 9 can be connected correspondingly to each of the equipment 8 in the FAB 7.

Therefore, if the process gas is supplied from each of the high-pressure gas cylinders secured in the cabinet 1, each process gas is introduced into each of the regulator boxes 5 along the gas supply lines 3 passing through the inside of the duct 4.

Thereafter, each process gas introduced into each of the regulator boxes 5 is purified through a filter (not illustrated) and then supplied flowing through each of the supply pipes 9, which are branched to a number corresponding to the equipment 8 in the FAB 7 and connected thereto, so that wafers can be processed.

As described above, if the gas is exhausted while being supplied through the gas supply lines 3 and the replacement time of the high-pressure gas cylinder is detected by a control unit (not illustrated), a worker closes the valve of the used high-pressure gas cylinder and separates the used high-pressure gas cylinder from the external gas line.

Thereafter, the worker unloads the high-pressure gas cylinder, which has been separated from the gas line, from the cabinet 1, replaces it with a new high-pressure gas cylinder, connects the high-pressure gas cylinder back to the external gas line, and opens the valve handle that closes the gas injection nozzle thereof, thereby completing the replacement of the high-pressure gas cylinder.

PRIOR ART DOCUMENTS

[Patent Document 0001] Korean Reg. Patent Publication No. 10-0242982 (Reg. on 15 Nov. 1998)
[Patent Document 0002] Korean Reg. Patent Publication No. 10-0649112 (Reg. on 16 Nov. 2006)
[Patent Document 0003] Korean Reg. Patent Publication No. 10-0985575 (Reg. on 29 Sep. 2010)

SUMMARY

However, the gasket used once for the connection part of the conventional high-pressure gas cylinder is deformed by being pressed by the annular protrusion band formed at the inlet of a gas injection nozzle, so that an indentation groove is formed. Therefore, whenever a high-pressure gas cylinder is replaced, the used gasket is removed and then replaced with a new gasket manually by a worker so that the replacement time of the high-pressure gas cylinder is delayed, which reduces the utilization rate of expensive equipment. In addition, depending on the skill and fatigue of the worker, if a human error occurs inadvertently in which a high-pressure gas cylinder is connected in the absence of a gasket or a gasket is inserted in a wrong direction, there is a problem of leaking harmful gas.

The present invention has been devised to solve the conventional problems as above and has an objective to realize automation of gasket replacement, in which a device for automatically replacing a gasket is provided at one side of a connector holder connected to a gas pipe so that when replacing a high-pressure gas cylinder, a used gasket is removed from the connector holder and stored in a gasket removal cartridge and at the same time a new gasket in a gasket insertion cartridge can be inserted into the connector holder.

Another object of the present invention is to allow used gaskets and new gaskets to be stored in cartridges, respectively, so as to prevent the occurrence of particles due to gasket replacement In order to achieve the purposes, according to one aspect of the present invention, there is provided a high-pressure gas cylinder automatic replacement device, comprising a holder fixedly provided on a main plate so as to be positioned at one side of a connector holder of a high-pressure gas cylinder connection unit, a movable member rotatably provided at the holder, a two-stage actuator provided at the holder such that rods thereof are respectively connected to the holder and a bracket fixed to the main plate, thereby rotating the movable member, a docking actuator for enabling the movable member to move from the holder towards the connector holder side or vice versa, a gasket removal cartridge provided at the movable member so as to automatically remove used gaskets from the connector holder and to accommodate the same in turn, and a gasket insertion cartridge provided at the movable member positioned at the upper portion of the gasket removal cartridge so as to insert a new gasket accommodated therein into the connector holder.

According to the present invention, when replacing a high-pressure gas cylinder, a used gasket is removed from a connector holder and then automatically replaced with a new gasket, thereby preventing human errors, in which toxic gas leaks from the connection part of a high-pressure gas cylinder due to the carelessness of a worker in the process of replacement of the high-pressure gas cylinder.

DETAILED DESCRIPTION

Figure 1:
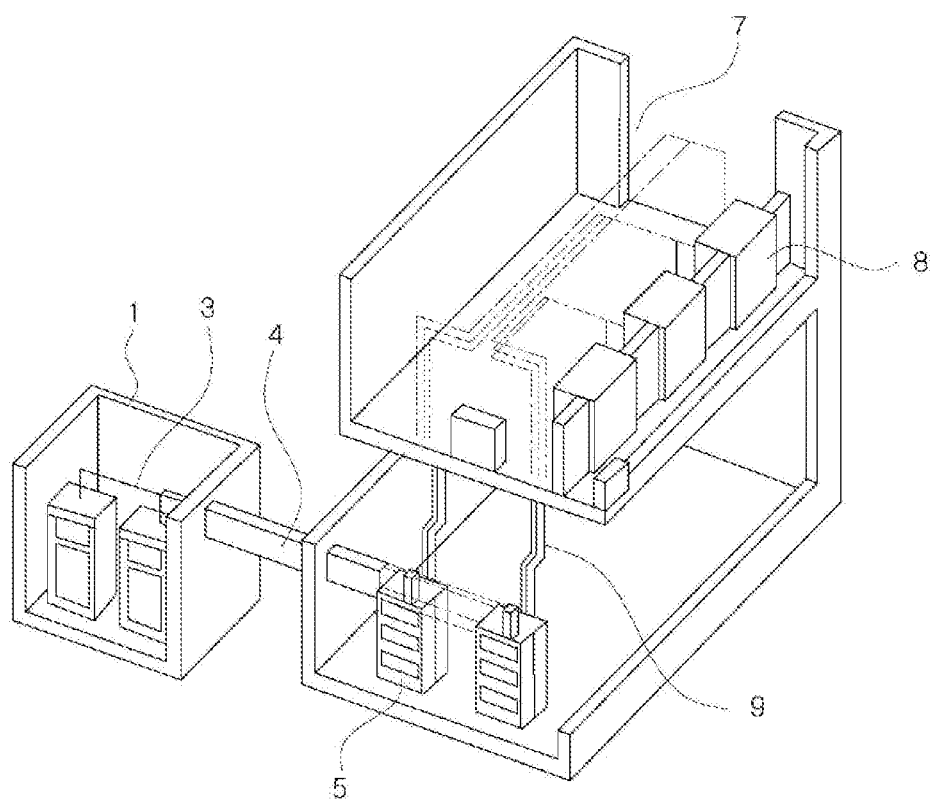
FIG. 1 is a perspective view for schematically showing a prior art gas supply device of semiconductor equipment.

Hereinafter, preferred embodiments of the present invention will be described in detail with reference to the accompanying drawings so that those skilled in the art to which the present invention belongs can easily practice. The present invention may be embodied in many different forms and should not be construed as limited to the embodiments set forth herein. It is to be noted that the drawings are schematic and not drawn to scale. The relative dimensions and proportions of the parts in the figures are shown to be exaggerated or reduced in size for clarity and convenience in the drawings and any dimensions are merely illustrative and not limiting. In addition, like structures, elements, or components appearing in two or more figures are used to indicate like features.

Figure 2:
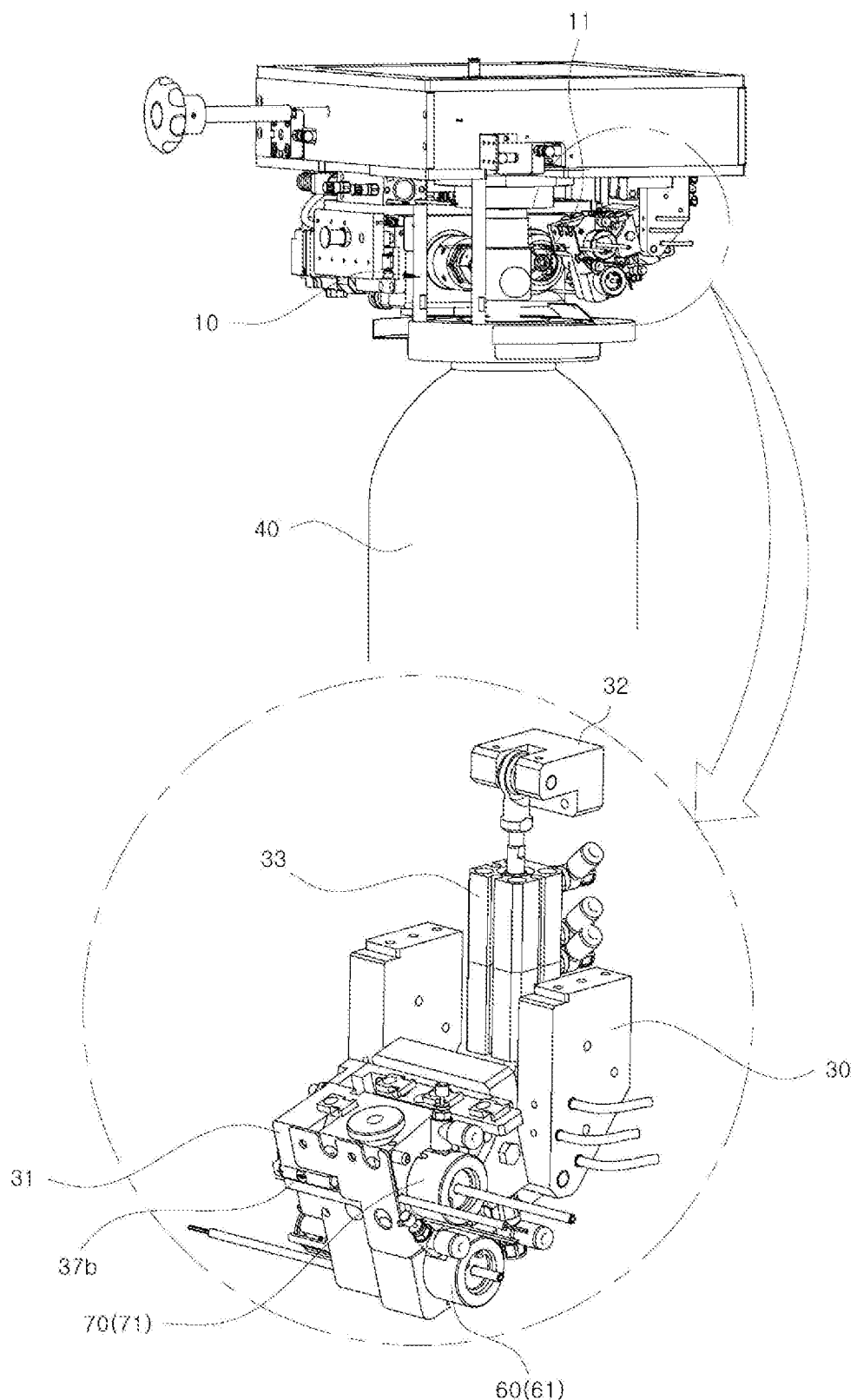
FIG. 2 is a perspective view for showing a state in which the present invention is installed.
Figure 3:
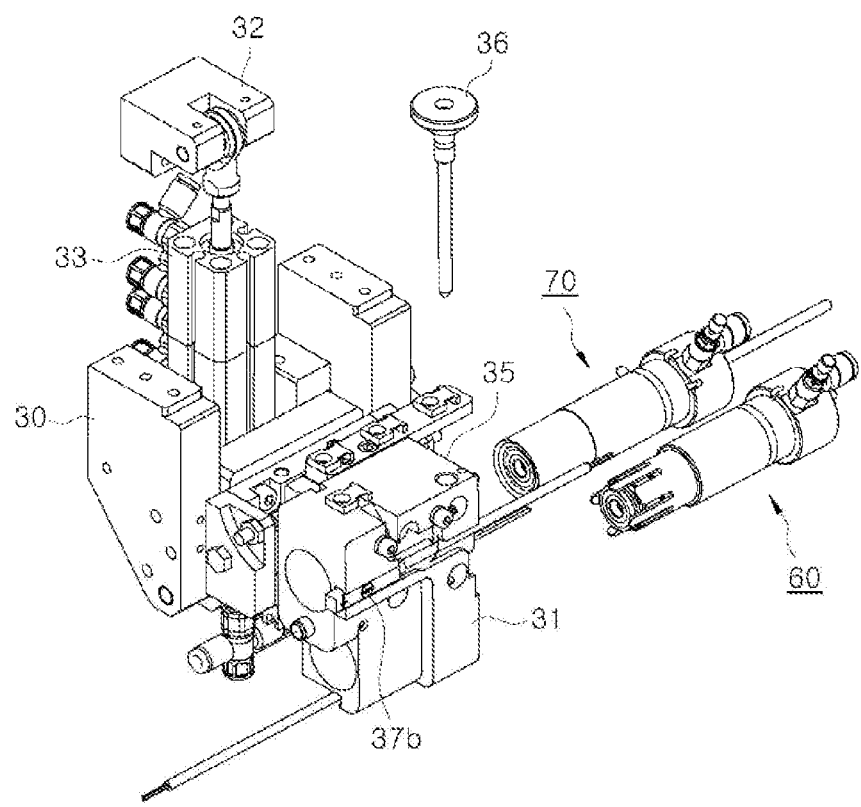
FIG. 3 is an exploded perspective view for showing the main parts of the present invention.
Figure 4:
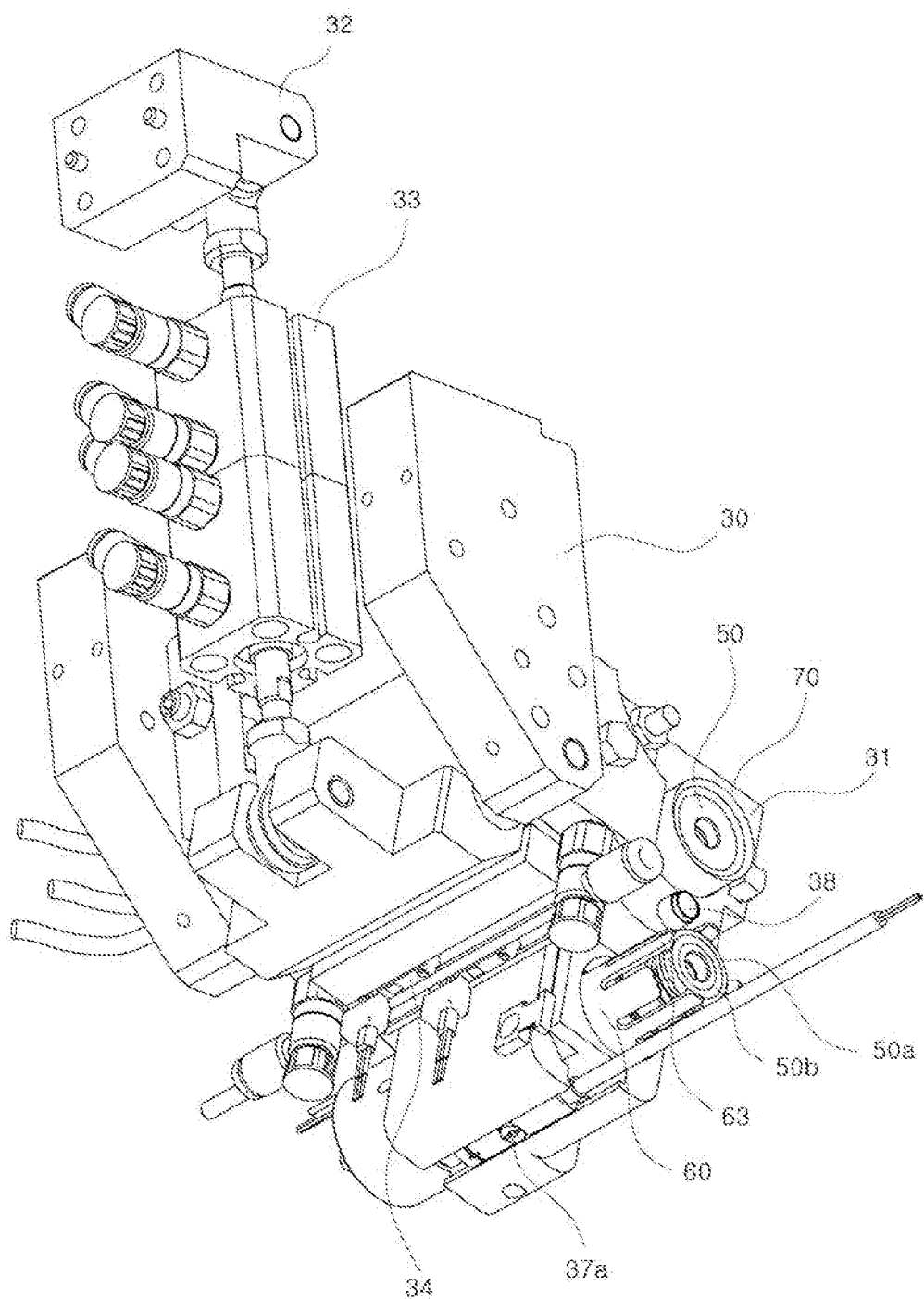
FIG. 4 is a perspective view for showing the assembled state of FIG. 3.
Figure 6:
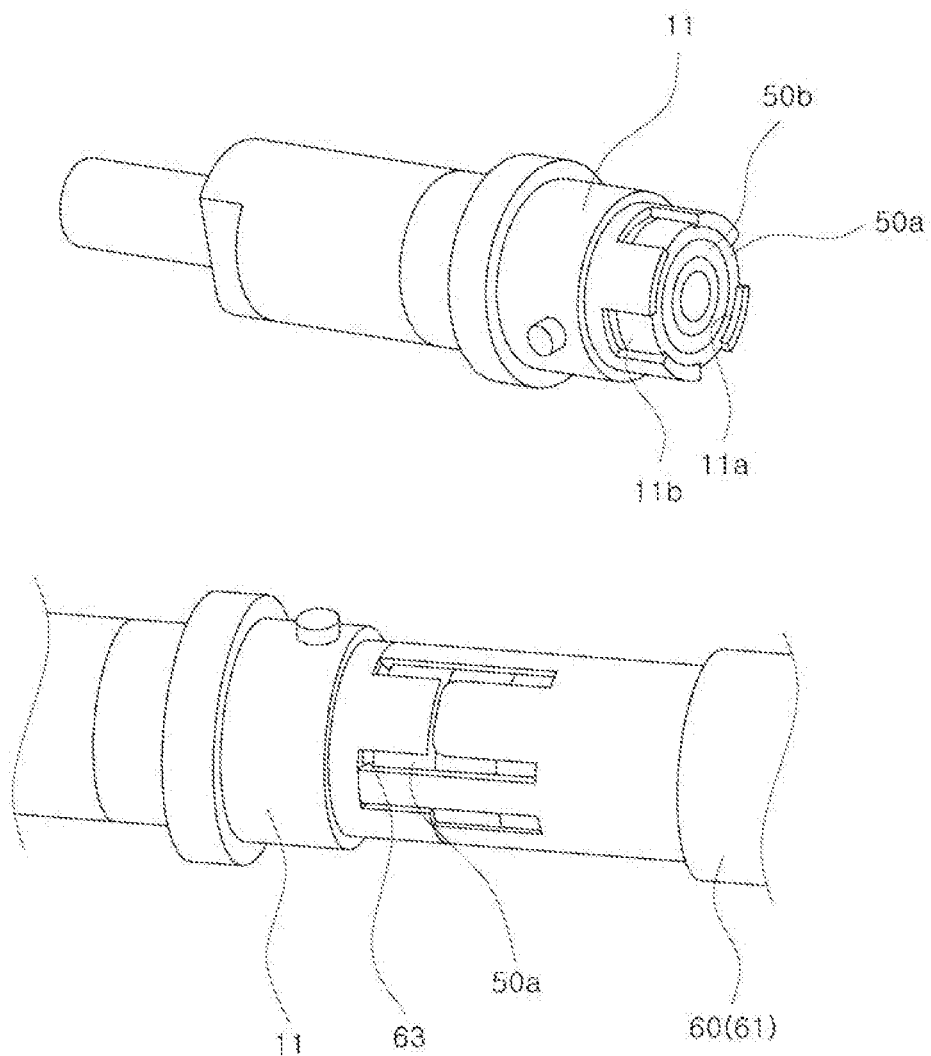
FIG. 6 shows a perspective view of a used gasket inserted into a connector holder and a perspective view of a state, in which the used gasket is held by the holding piece of the gasket removal cartridge.

FIG. 2 is a perspective view for showing a state in which the present invention is installed, FIG. 3 is an exploded perspective view for showing the main parts of the present invention, and FIG. 4 is a perspective view for showing the assembled state of FIG. 3. As shown in FIG. 6, if a gasket 50 is inserted into a connector holder 11 and the gas injection nozzle (not illustrated) of a high-pressure gas cylinder 40 is fastened, the both side surfaces of the gasket are deformed by being pressed by an annular protrusion band 11c formed on the inlet of the gas injection nozzle and the connector holder 11 so that an indented groove 50b is formed. Therefore, whenever a high-pressure gas cylinder 40 is replaced, a used gasket 50a must be removed and replaced with a new gasket 50.

The present invention includes a holder 30, which is fixedly provided on a main plate 20 so as to be positioned at one side of a connector holder 11 of a high-pressure gas cylinder connection unit 10, a movable member 31, which is rotatably provided at the holder 30, a two-stage actuator 33, which is provided at the holder 30 such that rods thereof are respectively connected to the movable member 31 and a bracket 32 fixed to the main plate 20, thereby rotating the movable member 31, a docking actuator 34, which enables the movable member 31 to move from the holder 30 towards the connector holder 11 side or vice versa, a gasket removal cartridge 60, which is provided at the movable member 31 so as to automatically remove used gaskets 50a from the connector holder 11 and to accommodate the same in turn, and a gasket insertion cartridge 70, which is provided at the movable member 31 positioned at the upper portion of the gasket removal cartridge 60 so as to insert a new gasket 50 accommodated therein into the connector holder 11.

Figure 8:
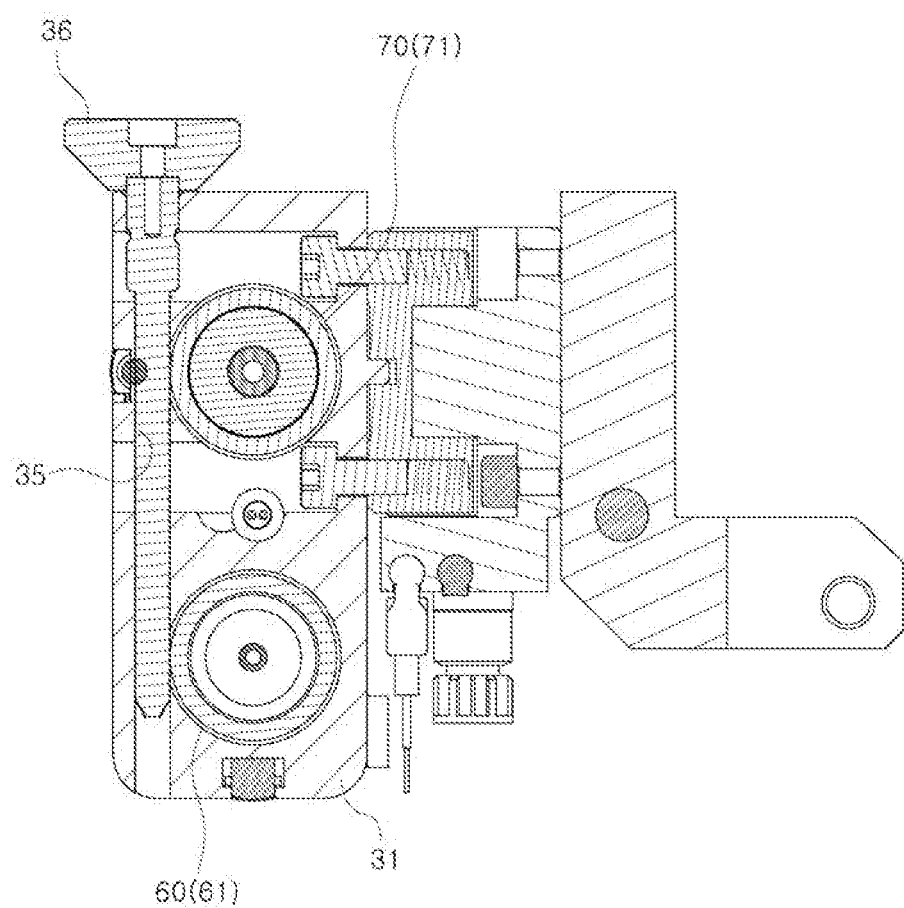
FIG. 8 is a longitudinal sectional view for showing a state, in which a one-touch knob supports the gasket removal cartridge and the gasket insertion cartridge inserted in a movable member.

The gasket removal cartridge 60 and the gasket insertion cartridge 70, which are detachably installed on the movable member 31, are configured to be supported by the circumferential surface of the one-touch knob 36 inserted into the insertion hole 35 formed in the upper portion of the movable member 31, as shown in FIG. 3 and FIG. 8, so as to provide convenience when replacing the gasket removal cartridge 60 or gasket insertion cartridge 70 from the movable member 31.

Figure 5:
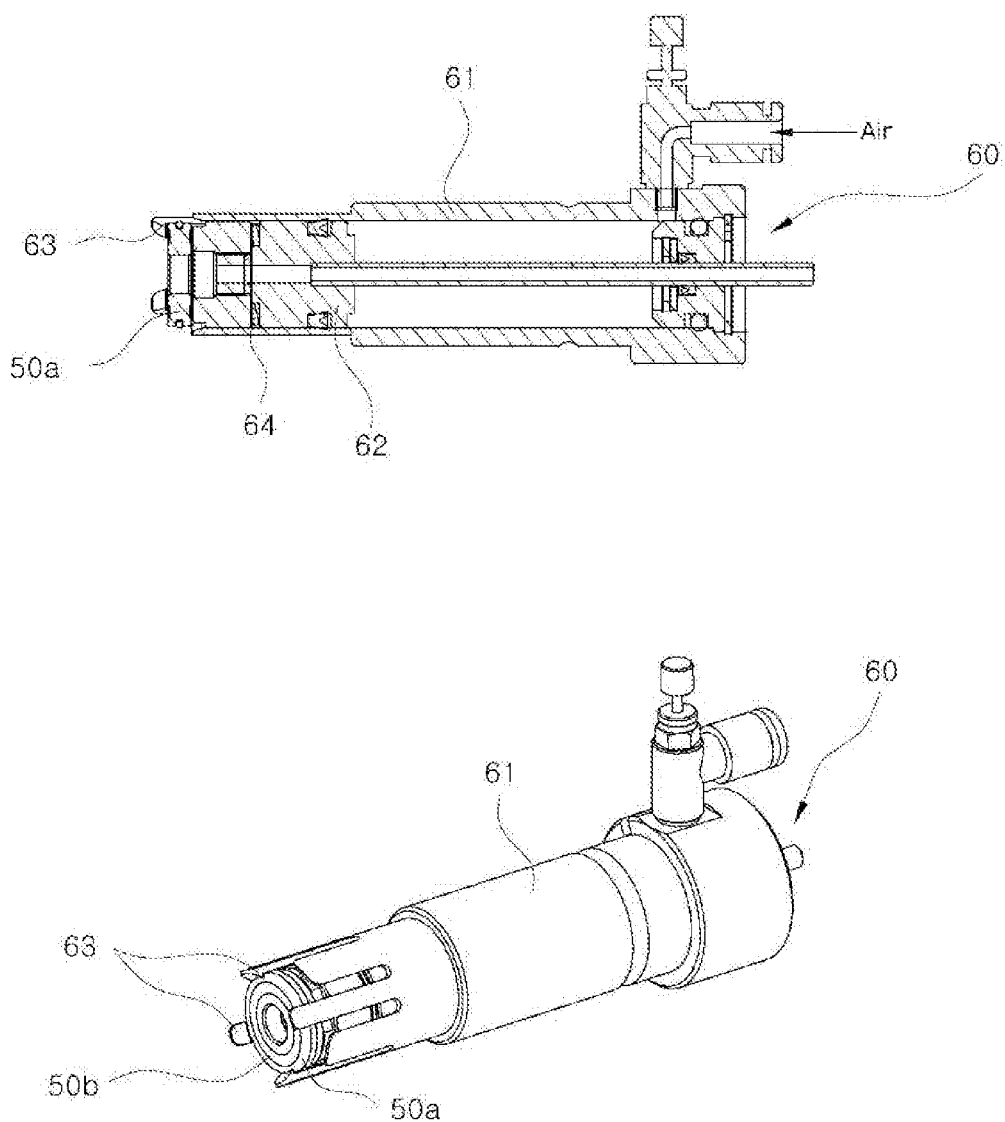
FIG. 5 shows a perspective view and a longitudinal sectional view of a gasket removal cartridge according to the present invention.

FIG. 5 shows a perspective view and a longitudinal sectional view of the gasket removal cartridge according to the present invention, in which the gasket removal cartridge 60 for separating the used gaskets 50a from the connector holder 11 so as to accommodate the same includes, as shown in FIG. 5, a first sleeve 61 having a cylindrical shape and receiving the used gaskets 50a in turn, a first piston 62 provided in the first sleeve 61 so as to move by air pressure, and holding pieces 63 formed at equal intervals on the front end of the first sleeve 61 so as to hold the gaskets 50a.

Figure 7:
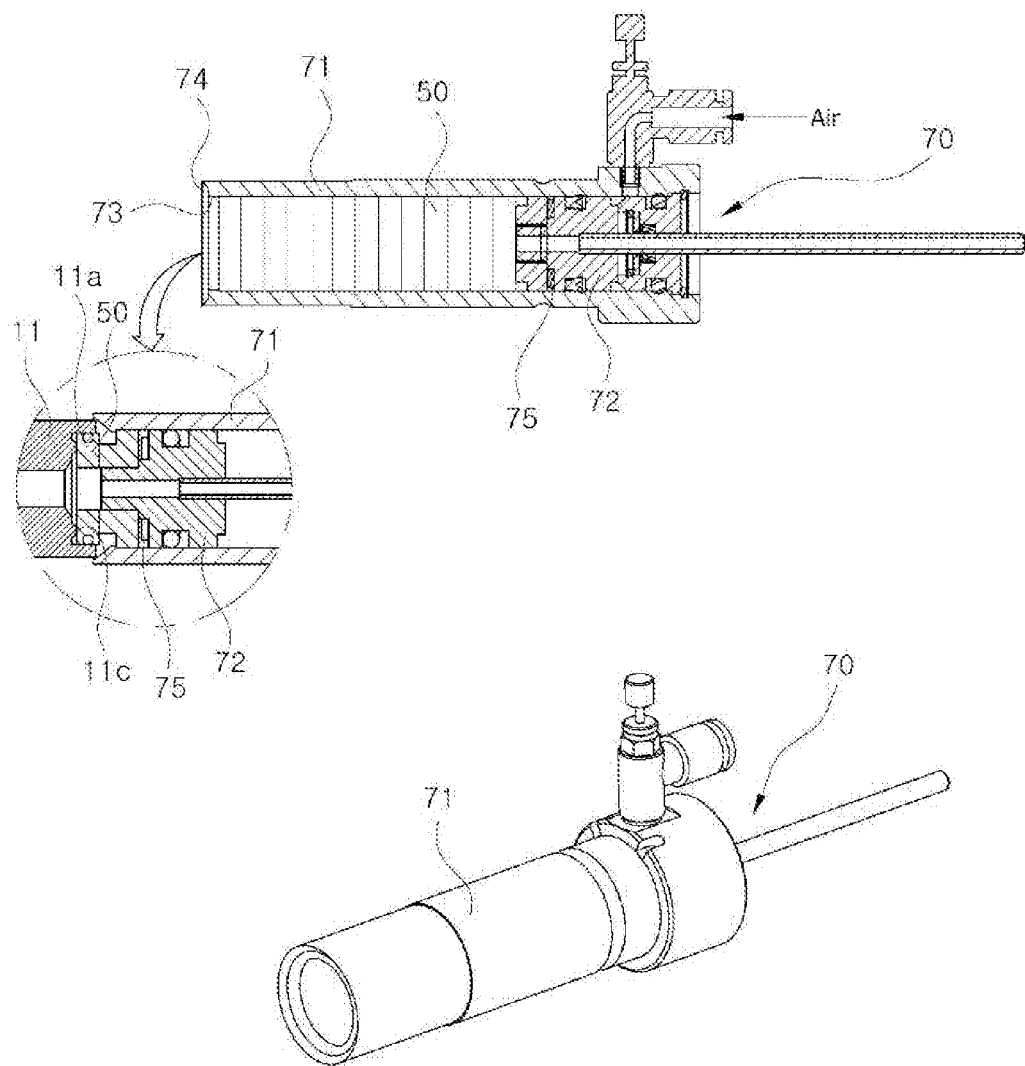
FIG. 7 shows a perspective view and a longitudinal sectional view of a gasket insertion cartridge according to the present invention.

The connector holder 11 includes, as shown in FIG. 6 and FIG. 7, a holding protrusion 11a formed on the inside thereof and cutaway parts 11b provided at the inlet thereof so as to allow the holding pieces 63 respectively formed on the front end of the first sleeve 61 to pass therethrough so that the holding pieces 63 move through the cutaway parts 11b and hold the rear surface of the used gasket 50a, as shown in FIG. 6.

According to an embodiment of the present invention, the used gasket 50a is described as being held by the gasket removal cartridge 60 by the cutaway parts 11b and holding pieces 63, but it is could be understood that the used gasket 50a can be held in various forms modified by a person skilled in the art.

FIG. 7 shows a perspective view and a longitudinal sectional view of the gasket insertion cartridge according to the present invention. The gasket insertion cartridge 70 for accommodating a plurality of unused gaskets 50 so as to insert the gaskets 50 into the connector holder 11 in turn after the used gasket 50a is removed from the connector holder 11 includes, as shown in FIG. 7, a second sleeve 71 having a cylindrical shape so as to accommodate the unused gaskets 50, a second piston 72 provided in the second sleeve 71 so as to move by air pressure, and a protrusion 73 formed on the inner circumferential surface of the outlet of the second sleeve 71 so as to limit the movement of the gasket 50.

A bevel edge 74 is formed at the front end of the second sleeve 71 so that the inlet of the connector holder 11 is connected thereto, and this is to ensure that the alignment between the inlet of the second sleeve 71 and the connector holder 11 is made precisely by the bevel edge 74 so that the gasket 50 can be accurately inserted into the connector holder 11, when the inlet of the second sleeve 71 is connected to the connector holder 11 so as to allow the gasket 50, which has been accommodated in the gasket insertion cartridge 70, to be inserted into the connector holder 11.

The lengths of the first and second sleeves 61, 71 of the gasket removal cartridge 60 and the gasket insertion cartridge 70 can be appropriately adjusted so as to allow approximately 10 to 15 gaskets 50, 50a to be accommodated and thus need not be limited separately.

Herein, it could be understood that it is possible to apply a metal material, a synthetic resin material, or a composite material thereof to the gasket 50 used in the present invention.

The gasket removal cartridge 60 and the gasket insertion cartridge 70 may be used and then cleaned so as to be reused, but it is more preferable to use the gasket removal cartridge 60 and the gasket insertion cartridge 70 as disposable single-use ones in consideration of contamination by particles.

The movable member 31 further includes first and second detection means for detecting the replacement timing of the gasket removal cartridge 60 and the gasket insertion cartridge 70, and the first and second detection means include magnets 64, 75 provided on the inside of the first and second pistons 62, 72, and first and second detecting sensor 37a, 37b for detecting the magnets 64, 75 so as to inform the replacement time of the gasket removal cartridge 60 or the gasket insertion cartridge 70, wherein when the gasket removal cartridge 60 is fully filled with the used gaskets 50a or the new gaskets 50 filled in the gasket insertion cartridge 70 are fully supplied to the connector holder 11, the first and second detecting sensors 37a, 37b detect this situations so that the gasket removal cartridge 60 and gasket insertion cartridge 70 are replaced as a whole.

Herein, the movable member 31 positioned between the gasket removal cartridge 60 and the gasket insertion cartridge 70 includes a reflective sensor 38 provided thereon, which detects whether any used gasket 50a remains in the connector holder 11 after removing the used gasket 50a from the connector holder 11 and before inserting a new gasket 50 thereinto so as to prevent an error from occurring as the new gasket 50 is inserted without removing the used gasket 50a from the connector holder 11.

The operation of the present invention will be described as follows.

First, after supplying the gas in the high-pressure gas cylinder 40 to the gas line through the connector holder 11, the high-pressure gas cylinder 40 needs to be replaced with a new high-pressure gas cylinder. When replacing the high-pressure gas cylinder, the gasket 50a inserted into the connector holder 11 cannot maintain the airtightness and must be replaced with a new gasket 50 since the gasket 50a inserted into the connector holder 11 is deformed by the gas injection nozzle and the protrusion band 11c of the connector holder 11 and thus the indented grooves 50b are formed on the both side surfaces of the gasket 50a.

Figure 9:
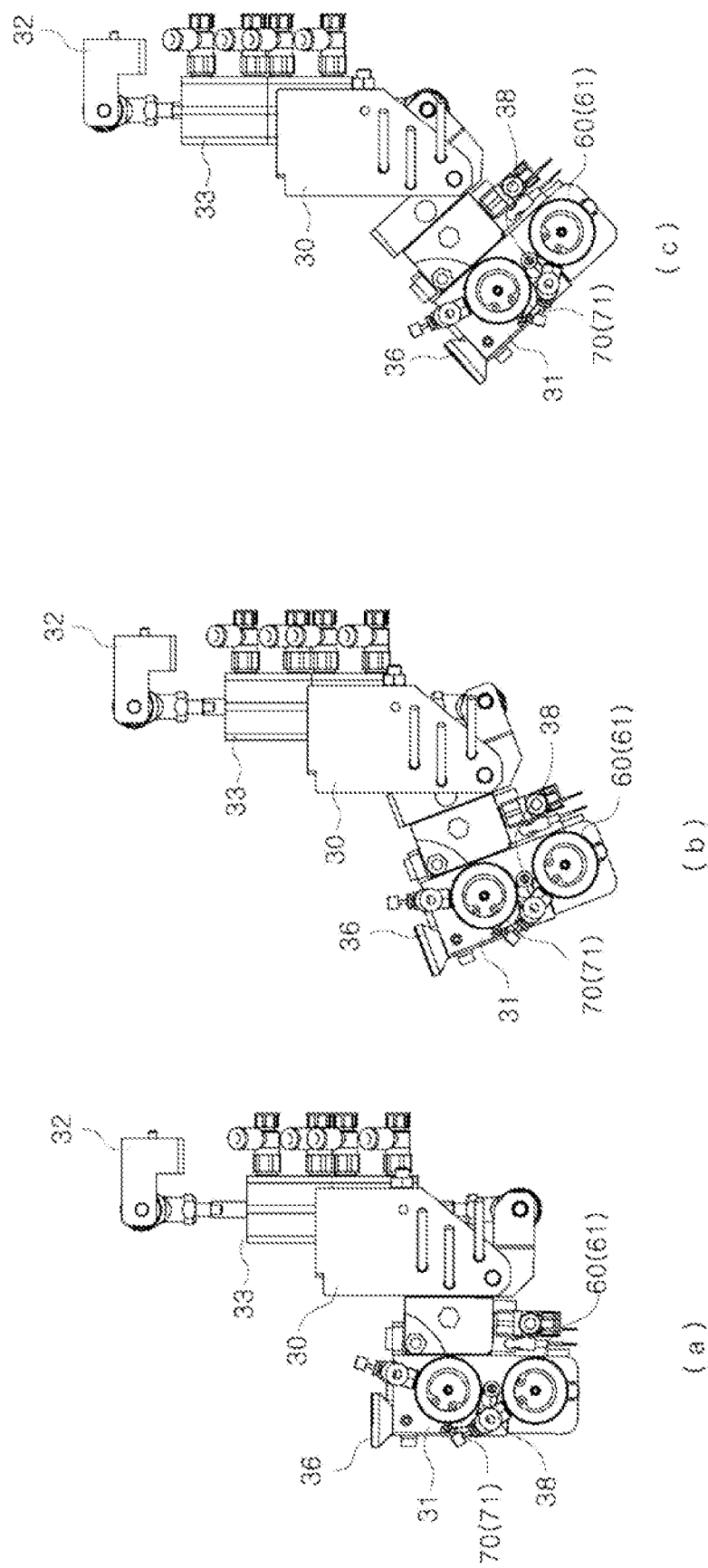
FIG. 9a to FIG. 9c are longitudinal sectional views for explaining the operating states of the present invention.

FIG. 9a to FIG. 9c are longitudinal sectional views for explaining the operating states of the present invention, wherein in the initial state in which the two-stage actuator 33 is not driven, the gasket removal cartridge 60 is positioned on the same horizontal line as the connector holder 11, as shown in FIG. 9a.

In this state, when the docking actuator 34 is driven to move the movable member 31 to the connector holder 11 side, the plurality of holding pieces 63 formed on the front end of the gasket removal cartridge 60 are inserted into the cutaway parts 11b formed in the connector holder 11 and then opened at the same time, as shown in FIG. 6. Then, as the plurality of holding pieces 63 reach the rear end of the used gasket 50a, the plurality of holding pieces 63 are closed inwards by restoring force, thereby holding the used gasket 50a.

After the holding pieces 63 of the gasket removal cartridge 60 hold the used gasket 50a as described above, air is supplied to the inside of the first sleeve 61 and thus the first piston 62 moves to the right side in the drawing, thereby being connected to one surface of the gasket 50a that is to be removed.

However, it would be understood that if the first sleeve 61 of the gasket removal cartridge 60 is filled with the used gaskets 50a, the holding pieces 63 come into contact with the used gasket 50a, which is positioned at the frontmost end so as to be removed.

If the movable member 31 is returned to its initial position by the docking actuator 34 in the state as described above, in which the holding pieces 63 hold the gasket 50a that is to be removed, then the used gasket 50a is removed from the connector holder 11 and then received inside the first sleeve 61.

After the used gasket 50a is removed from the connector holder 11, a new gasket 50 has to be inserted into the connector holder 11.

In order to insert the new gasket 50 into the connector holder 11, if the two-stage actuator 33 is driven at the first stage so as to rotate the movable member 31 as shown in FIG. 9b, the reflective sensor 38 provided between the gasket removal cartridge 60 and the gasket insertion cartridge 70 is positioned on the horizontal line with the connector holder 11 and thus detects whether the used gasket 50a is inside the connector holder 11.

Therefore, if the reflective sensor 38 detects the used gasket 50a, the reflective sensor 38 generates an error and, at the same time, informs a worker of the error by means of an alarm means so that the worker manually removes the used gasket 50a. However, if no used gasket is detected, the two-stage actuator 33 is driven at the second stage so as to rotate the movable member 31, as shown in FIG. 9c, until the gasket insertion cartridge 70 is positioned on the same horizontal line as the connector holder 11.

After that, if the docking actuator 34 moves the movable member 31 to the connector holder 11 side so that the front end of the second sleeve 71 is connected to the connector holder 11 as described above, the alignment of the second sleeve 71 and the connector holder 11 is precisely carried out due to the bevel edge 74 formed on the front end of the second sleeve 71.

In this state, if air is supplied to the gasket insertion cartridge 70, the second piston 72 moves to the connector holder 11 side and thus the new gasket 50 positioned at the frontmost end is inserted into the connector holder 11, wherein since the holding protrusion 11a is formed on the inside of the inlet of the connector holder 11, the gasket 50 inserted in the connector holder 11 does not deviated therefrom even if the gasket insertion cartridge 70 is returned to its initial position.

After the new gasket 50 is inserted into the connector holder 11 as described above, the movable member 31 is returned to its initial position by the docking actuator 34 and then returned as shown in FIG. 9a by the operation of the two-stage actuator 33 so as to be maintained in the standby state by next gasket replacement timing.

It is more preferable that the replacement of the gasket 50 as mentioned above is carried out immediately before a new high-pressure gas cylinder 40 is connected to the connector holder 11.

This is because the new gasket 50 that has been replaced may be contaminated with fine dust or the like as it is exposed to the atmosphere.

Meanwhile, as the first detecting sensor 37a that is the first detection means detects that the gasket removal cartridge 60 is fully filled with the used gaskets 50a or the second detection sensor 37b that is the second detection means detects that the new gaskets 50 are all supplied and thus the gasket insertion cartridge 70 has no gaskets, the gasket removal cartridge 60 or the gasket insertion cartridge 70 has to be replaced in the movable member 31. According to the present invention, the gasket removal cartridge 60 and the gasket insertion cartridge 70 are supported by the circumferential surface of the one-touch knob 36 fitted in the insertion hole 35 formed in the movable member 31. Therefore, the gasket removal cartridge 60 or the gasket insertion cartridge 70 can be removed from the movable member 31 by simply removing the one-touch knob 36 from the movable member 31. As a result, it is possible to quickly and simply perform these replacement operations.

The gasket removal cartridge 60 and the gasket insertion cartridge 70 that have been replaced as described above may be cleaned and reused, but it is more preferable to use the gasket removal cartridge 60 and the gasket insertion cartridge 70 as disposable single-use ones so that the gas due to reuse is not contaminated with particles or the like.

While the present invention has been particularly shown and described with reference to the preferred embodiments thereof, it will be understood by those skilled in the art that various changes in form and details may be made therein without departing from the spirit and scope of the invention as defined by the appended claims.

Therefore, the above-described embodiments are to be considered in all respects as illustrative and not restrictive, and the scope of the invention as set forth in the foregoing detailed description is indicated by the following claims, and all such modifications or variations that come within the meaning and range of the claims and their equivalents are intended to be embraced therein.

What is claimed is:

1. A high-pressure gas cylinder automatic replacement device, comprising:
    a holder fixedly provided on a main plate so as to be positioned at one side of a connector holder of a high-pressure gas cylinder connection unit;
    a movable member rotatably provided at the holder;
    a two-stage actuator provided at the holder such that a rod thereof is connected to the movable member and a bracket fixed to the main plate, thereby rotating the movable member;
    a docking actuator for enabling the movable member to reciprocate between the holder and the connector holder;
    a gasket removal cartridge provided in the movable member and configured to automatically remove used gaskets from the connector holder and to accommodate the used gaskets therein in turn; and
    a gasket insertion cartridge provided in the movable member positioned at an upper portion of the gasket removal cartridge and configured to insert a new gasket accommodated therein into the connector holder.

2. The high-pressure gas cylinder automatic replacement device according to claim 1, wherein the gasket removal cartridge and the gasket insertion cartridge which are detachably provided to the movable member are supported by a one-touch knob.

3. The high-pressure gas cylinder automatic replacement device according to claim 1, wherein the gasket removal cartridge includes a first sleeve in a cylindrical shape for receiving the used gaskets in turn, a first piston provided in the first sleeve so as to move by air pressure, and holding pieces formed at equal intervals on a front end of the first sleeve so as to hold the used gaskets.

4. The high-pressure gas cylinder automatic replacement device according to claim 3, wherein holding are formed on an inside of the connector holder and cutaway parts are formed at an inlet of the connector holder so as to allow the holding pieces formed on the first sleeve to pass through the cutaway parts, so that a used gasket is removed as the movable member retracts by the docking actuator in a state, where the holding pieces move through the cutaway parts and holds the used gasket.

5. The high-pressure gas cylinder automatic replacement device according to claim 1, wherein the gasket insertion cartridge includes a second sleeve in a cylindrical shape for receiving new gaskets, a second piston provided in the second sleeve so as to move by air pressure, and a protrusion formed on an inner circumferential surface of an outlet of the second sleeve so as to limit the movement of the new gaskets.

6. The high-pressure gas cylinder automatic replacement device according to claim 5, wherein a bevel edge is formed at a front end of the second sleeve so as to be connected to the inlet of the connector holder.

7. The high-pressure gas cylinder automatic replacement device according to claim 1, wherein the movable member further includes first and second detection means for detecting replacement time of the gasket removal cartridge and the gasket insertion cartridge.

8. The high-pressure gas cylinder automatic replacement device according to claim 7, wherein the first and second detection means include magnets provided on the first and second pistons and first and second detecting sensors for detecting the magnets so as to inform the replacement time of the gasket removal cartridge or the gasket insertion cartridge.

9. The high-pressure gas cylinder automatic replacement device according to claim 1, wherein a reflective sensor is provided on the movable member positioned between the gasket removal cartridge and the gasket insertion cartridge so as to detect whether any used gasket remains in the connector holder after removing a used gasket from the connector holder and before inserting the new gasket into the connector holder.

10. The high-pressure gas cylinder automatic replacement device according to claim 1, wherein the gasket removal cartridge or the gasket insertion cartridge replaced from the movable member is disposed of.

* * * * *